US006963849B1

(12) United States Patent
Chaturvedi et al.

(10) Patent No.: US 6,963,849 B1
(45) Date of Patent: Nov. 8, 2005

(54) PROVIDING DECISION SUPPORT BASED ON PAST PARTICIPANT PERFORMANCE WITHIN AN ELECTRONIC MARKETPLACE ENVIRONMENT

(75) Inventors: Harsha Chaturvedi, Coppell, TX (US); Ranjit N. Notani, Irving, TX (US); Abhay V. Parasnis, Coppell, TX (US)

(73) Assignee: i2 Technologies US, INC, Dallas, TX (US)

( * ) Notice: Subject to any disclaimer, the term of this patent is extended or adjusted under 35 U.S.C. 154(b) by 284 days.

(21) Appl. No.: 09/953,462

(22) Filed: Sep. 14, 2001

Related U.S. Application Data

(60) Provisional application No. 60/238,307, filed on Oct. 5, 2000.

(51) Int. Cl.⁷ ............................................. G06F 17/60
(52) U.S. Cl. ...................................................... 705/10
(58) Field of Search ........................................ 705/10

(56) References Cited

U.S. PATENT DOCUMENTS

| | | | |
|---|---|---|---|
| 4,996,642 A * | 2/1991 | Hey ............................ | 705/27 |
| 5,041,972 A | 8/1991 | Frost ........................... | 364/401 |
| 5,237,496 A | 8/1993 | Kagami et al. .............. | 364/401 |
| 5,305,199 A | 4/1994 | LoBiondo et al. .......... | 364/403 |
| 5,459,306 A * | 10/1995 | Stein et al. .................. | 235/383 |
| 5,583,763 A * | 12/1996 | Atcheson et al. ............. | 707/3 |
| 5,712,989 A | 1/1998 | Johnson et al. ............. | 395/228 |
| 5,715,444 A | 2/1998 | Danish et al. ............... | 395/604 |
| 5,734,890 A | 3/1998 | Case et al. ................... | 395/605 |
| 5,749,081 A * | 5/1998 | Whiteis ....................... | 707/102 |
| 5,765,143 A | 6/1998 | Sheldon et al. .............. | 705/28 |
| 5,960,414 A | 9/1999 | Rand et al. ................... | 705/28 |
| 5,963,920 A | 10/1999 | Rose et al. ................... | 705/28 |
| 6,009,407 A | 12/1999 | Garg ............................ | 705/10 |
| 6,012,051 A | 1/2000 | Sammon, Jr. et al. ........ | 706/52 |

(Continued)

FOREIGN PATENT DOCUMENTS

EP   0 463 616   1/1992

OTHER PUBLICATIONS bizrate.com website; pages available on or before Aug. 15,2000; retrieved from archive.org on Apr. 12, 2004.*

(Continued)

*Primary Examiner*—Richard Chilcot
(74) *Attorney, Agent, or Firm*—James E. Walton; Brian E. Harris

(57) ABSTRACT

An electronic marketplace system (10) operates on one or more computers that collectively facilitate marketplace interactions between one or more first participants (12, 14) and a second participant (14, 12). The system (10) receives feedback as to performance of the second participant (14, 12) from the first participants (12, 14) based on their interactions with the second participant (14, 12). The system (10) associates a participant-specific rating with the second participant (14, 12) based on the feedback received from a particular first participant (12, 14), the participant-specific rating of the second participant (14, 12) being specific to the first participant (12, 14), being independent of feedback received from other first participants (12, 14), and being stored in a profile maintained for the first participant (12, 14). The system (10) accesses the profile maintained for the first participant (12, 14) in response to an identification of the second participant (14, 12) as a potential partner for the first participant (12, 14) as to a potential interaction. According to the participant-specific rating of the second participant (14, 12), the system (10) provides an indication to the first participant (12, 14) reflecting the desirability of interacting with the second participant (14, 12) with respect to the potential interaction.

34 Claims, 4 Drawing Sheets

U.S. PATENT DOCUMENTS

| | | | |
|---|---|---|---|
| 6,049,777 A | 4/2000 | Sheena et al. ................. | 705/10 |
| 6,055,519 A | 4/2000 | Kennedy et al. .............. | 705/80 |
| 6,064,980 A | 5/2000 | Jacobi et al. .................. | 705/26 |
| 6,167,380 A | 12/2000 | Kennedy et al. .............. | 705/10 |
| 6,195,652 B1 | 2/2001 | Fish .............................. | 707/2 |
| 6,249,774 B1 | 6/2001 | Roden et al. .................. | 705/28 |
| 6,266,652 B1 | 7/2001 | Godin et al. ................... | 705/37 |
| 6,317,722 B1 * | 11/2001 | Jacobi et al. .................. | 705/14 |
| 6,321,133 B1 | 11/2001 | Smirnov et al. ............ | 700/100 |
| 6,324,522 B2 | 11/2001 | Peterson et al. .............. | 705/28 |
| 2002/0013721 A1 | 1/2002 | Dabbiere et al. .............. | 705/7 |
| 2002/0019761 A1 | 2/2002 | Lidow ........................ | 706/10 |
| 2002/0103692 A1 * | 8/2002 | Rosenberg et al. ........... | 705/10 |
| 2003/0070070 A1 * | 4/2003 | Yeager et al. ................ | 713/157 |
| 2003/0083961 A1 * | 5/2003 | Bezos et al. ................... | 705/27 |
| 2003/0093329 A1 * | 5/2003 | Gutta .......................... | 705/26 |
| 2003/0105682 A1 * | 6/2003 | Dicker et al. ................. | 705/27 |

OTHER PUBLICATIONS epinions.com website; pages available on or before Aug. 15, 2000; retrieved from archive.org on Apr. 12, 2004.*

Notess, Greg R. "Consumers' revenge: Online product reviews and ratings". Econtent. Wilton: Apr./May 2000. Vol. 23, Iss. 2; p.61, 4 pgs.*

PCT, Notification of Transmittal of the International Search Report or the Declaration, 5 pages PCT/US01/31317, Feb. 13, 2002.

PCT, Notification of Transmittal of the International Search Report or the Declaration, 3 pages PCT/US01/31212, Feb. 13, 2002.

Unknown, "Sellers Flock to OutletZoo.com as New Automatic Price drop Method Moves Excess Inventory Online," Business wire, DIALOG(R)File 610: Buisenss Wire, 2 pages, Oct. 25, 1999.

Unknown, "OpenSite Technologies, Inc. Helps AOL Raise $100,000 With Online Charity Auction," Buisness Wire, DIALOG(R)File 621:Gale Group New Prod.Annou. (R), 1 page, Jan. 06,1999.

Unknown, "News Briefs," Interactive PR & Marketing News, v4, n31, DIALOG(R)file 636:Gale Group Newsletter DB (TM), Sept. 19,1997.

PCT Notification of Transmittal of the International Search Report or the Declaration, 3 pages PCT/US01/31721, Jan. 17, 2002.

PCT Notification of Transmittal of the International Search Report or the Declaration, 6 pages PCT/US01/31213, Jan. 23, 2002.

Funaki, et al., "Method and system for Production Planning Transaction," JP02001331693a, EAST Version 1.03.0002, 58 pages, Apr. 9, 2002.

PCT, Notification of Transmittal of the International Search Report or the Declaration, 3 pages PCT/US01/31424, Aug. 29, 2002.

* cited by examiner

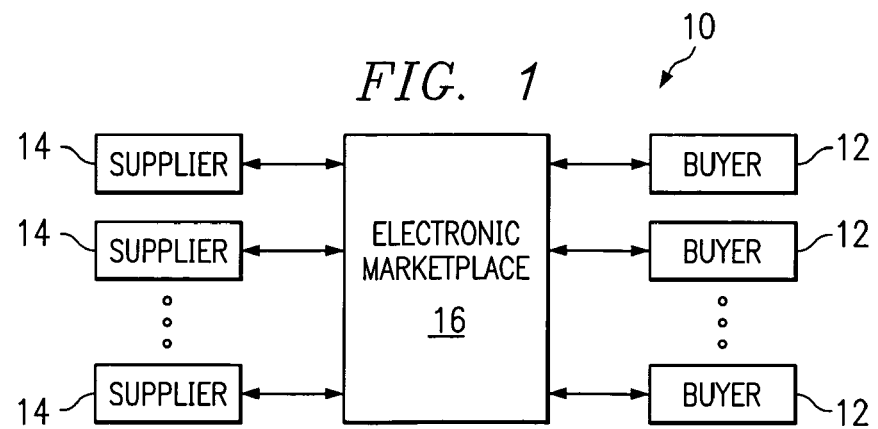
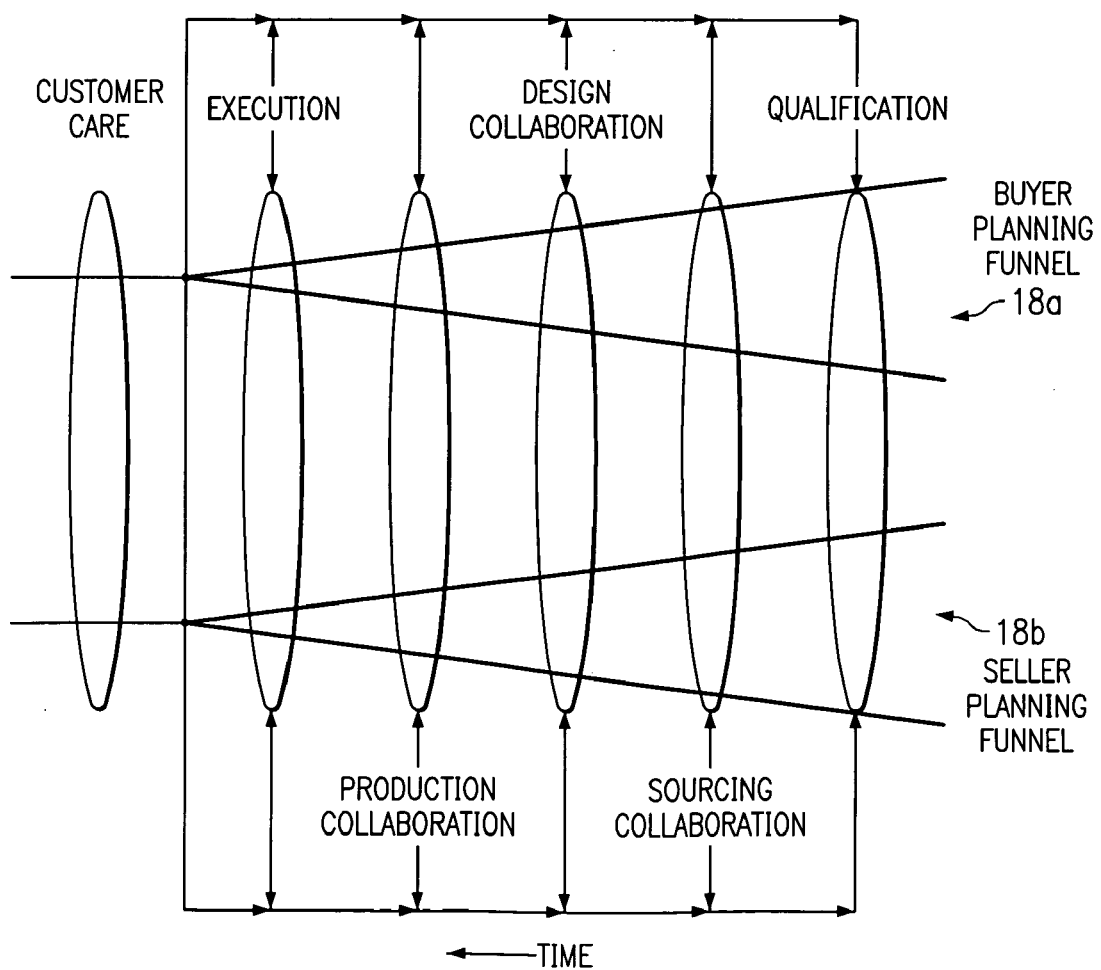

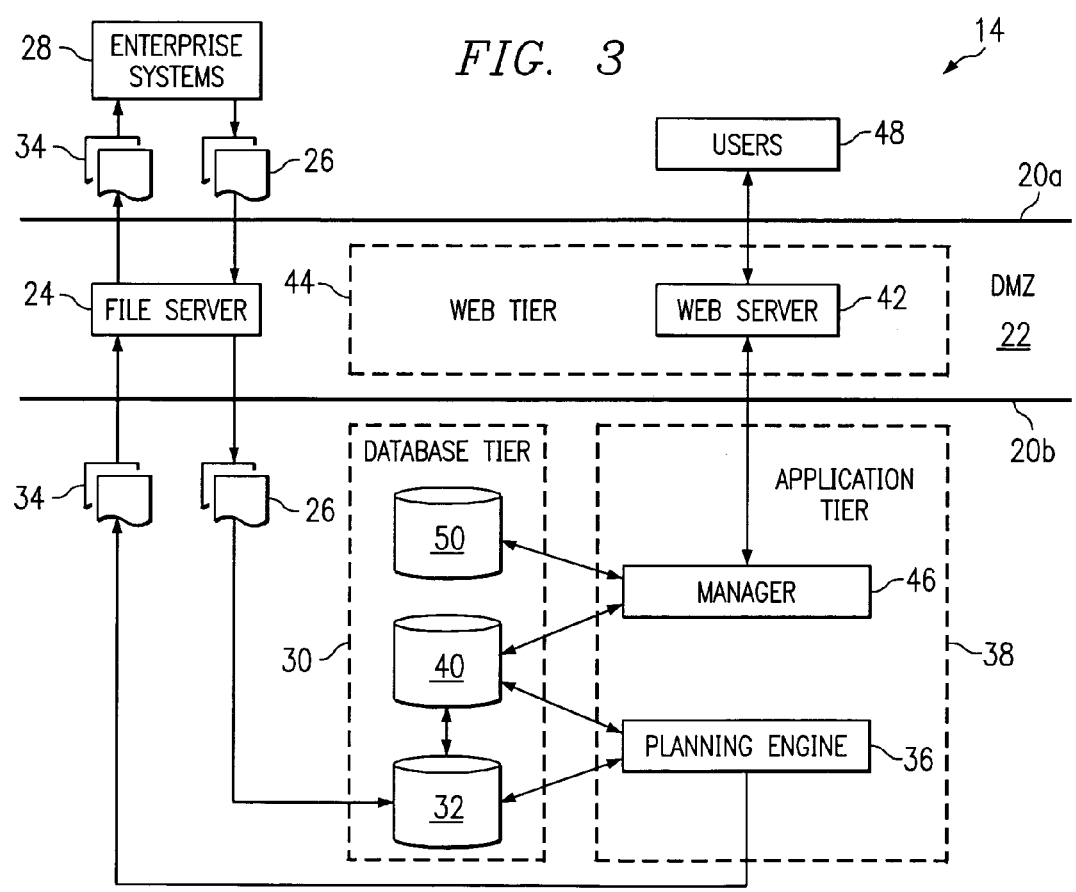

US 6,963,849 B1

PROVIDING DECISION SUPPORT BASED ON PAST PARTICIPANT PERFORMANCE WITHIN AN ELECTRONIC MARKETPLACE ENVIRONMENT

RELATED APPLICATIONS

This application claims the benefit under 35 U.S.C. § 119(e) of U.S. Provisional Application Ser. No. 60/238,307, filed Oct. 5, 2000.

TECHNICAL FIELD OF THE INVENTION

This invention relates generally to electronic marketplaces, and more particularly to providing decision support based on past participant performance within an electronic marketplace environment.

BACKGROUND OF THE INVENTION

Enterprises must regularly collaborate to carry out their operations. For example, enterprises may collaborate with respect to sourcing, design, production, and any other suitable activities. Despite the collaboration needs of enterprises and the sophistication of many electronic marketplace processes, previous techniques have been inadequate for many needs. For example, even if an enterprise knows the identities of other enterprises with which the enterprise may collaborate as to sourcing, design, production, or another activity, the enterprise may have no effective way to determine whether and to what extent another enterprise can be relied on as to the activity, has expertise and experience as to the activity, or otherwise can be expected to perform as to the activity. Although previous electronic marketplaces have provided limited buyer behavior analysis (e.g., usually purchases non-fiction books) or simple supplier scorecarding (e.g., has a three star rating), previous techniques have been inadequate to meet the needs of many more sophisticated marketplace participants.

SUMMARY OF THE INVENTION

According to the present invention, problems and disadvantages associated with previous electronic marketplaces may be reduced or eliminated.

In one aspect of the present invention, an electronic marketplace system operates on one or more computers that collectively facilitate marketplace interactions between one or more first participants and a second participant and receive feedback concerning performance of the second participant from the first participants based on their interactions with the second participant. The marketplace system associates a participant-specific rating with the second participant based on the feedback received from a particular first participant, the participant-specific rating of the second participant being specific to the particular first participant, being independent of feedback received from other first participants, and being stored in a profile maintained for the particular first participant. The marketplace system accesses the profile maintained for the particular first participant in response to an identification of the second participant as a potential partner for the particular first participant as to a potential interaction. According to the participant-specific rating of the second participant, the marketplace system provides an indication to the particular first participant reflecting the desirability of interacting with the second participant with respect to the potential interaction.

Certain embodiments of the present invention may provide one or more technical advantages. The present invention may provide one or more buyers, suppliers, or other participants in an electronic marketplace environment with decision support, based on past performance of other marketplace participants, to improve their experience with the electronic marketplace and the success of their collaborations and the executions based on these collaborations. Ratings or other suitable performance information may be compiled, for each participant and for each activity involving that participant, based on feedback received from the other participants with which the participant has interacted. Feedback concerning a participant may be received with respect to its performance during one or more pre-execution collaboration phases, during an execution phase, or during one or more post-execution phases of a current execution cycle. In general, where appropriate, one or more pre-execution phases of an execution cycle are referred to collectively as a planning cycle for the execution cycle. The ratings or other performance information for this participant may then be provided to any other participants for decision support in connection with any suitable pre-execution stage of the same or a subsequent planning cycle, providing an important technical advantage. The ratings or other performance information may be personal to a participant (i.e. based only on interaction between the rating participant and the evaluated participant) or global to the marketplace (e.g., based on interactions between multiple rating participants and the evaluated participant). A participant is preferably always free to "override" or otherwise ignore information about the performance of other participants; however, it is assumed that the availability of such information will improve the overall marketplace experience for most participants and will seldom be ignored.

For example, in a qualification phase in which an enterprise evaluates potential collaboration partners, ratings or other performance information for the potential partners may be provided to the enterprise to allow the enterprise to determine which of these potential partners to collaborate with as to sourcing, design, production, or any other subsequent collaboration phase. Ratings or other performance information may reflect performance of a potential partner during prior collaboration phases of the same type (e.g., prior sourcing collaboration phases, where sourcing collaboration decisions are being made), prior collaboration phases of another type (e.g., prior design, production, or other collaboration phases, where sourcing collaboration decisions are being made), prior execution phases, or during prior post-execution phases, as appropriate.

Ratings or other performance information may be provided to an enterprise in connection with sourcing, design, production, or other collaboration decisions occurring subsequent to the qualification stage in a similar manner. As an example, in a sourcing collaboration phase, the present invention may provide ratings or other performance information for a sourcing collaboration partner to the enterprise to allow the enterprise to determine whether and to what extent to which the partner may be relied on to meet the sourcing needs of the enterprise. If the partner has proven extremely reliable during prior execution phases, the enterprise may source all of its needs from the partner with the expectation that execution will be satisfactory. On the other hand, if the partner has proven rather unreliable, the enterprise may decide to source its needs from multiple partners to help ensure that its needs will actually be met.

Furthermore, as noted above, rating input for use in a pre-execution phase of a current planning cycle may be obtained in connection with pre-execution phases of the current or a previous planning cycle, such as in connection with one or more sourcing, design, production, or other collaboration phase for example. As just an example, with respect to a buyer, the present invention may provide for dynamic configuration of base fair share allocation criteria (specifying how demands are distributed among suppliers) within a production collaboration phase based on supplier performance during an earlier sourcing or design collaboration phase associated with the same or a previous execution cycle. Similarly, with respect to a supplier, the present invention may allow dynamic configuration of fulfillment criteria (specifying how available supply will be distributed among buyers) in a production collaboration phase based on buyer performance in an earlier phase of the same or a different execution cycle.

During an execution phase in which a participant consummates a commercial transaction, the present invention may enable ratings or other performance information for potential trading partners to be provided to the enterprise to allow the enterprise to determine which of these potential trading partners to purchase from or sell to. Ratings or other performance information may reflect performance of a potential partner during prior pre-execution phases of the same or one or more previous execution cycles, prior execution phases of one or more previous execution cycles, or prior post-execution phases of one or more previous execution cycles. As an example, the marketplace may provide information about past performance of suppliers to a buyer to allow the buyer to determine whether, to what extent, and under what conditions to purchase from some supplier. Similarly, the marketplace may provide information about past performance of buyers to a supplier or other participant (such as a financier or other financial entity) to allow the supplier or other participant to better determine whether, to what extent, and under what conditions to transact business with some buyer.

According to the present invention, participants may have increased confidence that interactions involving other participants will in fact meet their needs, based on the past performance of these other participants within the marketplace environment. The marketplace may learn based on such past performance and may use this knowledge, or provide this knowledge to a participant, to facilitate better decision-making. Participants may achieve greater satisfaction with their partners and with the marketplace overall. Other technical advantages may be readily apparent to those skilled in the art from the figures, descriptions, and claims included herein.

BRIEF DESCRIPTION OF THE DRAWINGS

To provide a more complete understanding of the present invention and features and advantages thereof, reference is made to the following description in conjunction with the accompanying drawings, in which:

FIG. 1 illustrates an example system for providing guided buying decision support, based in part on past participant performance, within an electronic marketplace environment;

FIG. 2 illustrates example planning funnels for a buyer and a supplier;

FIG. 3 illustrates an example electronic marketplace;

DETAILED DESCRIPTION OF THE INVENTION

Figure 4:
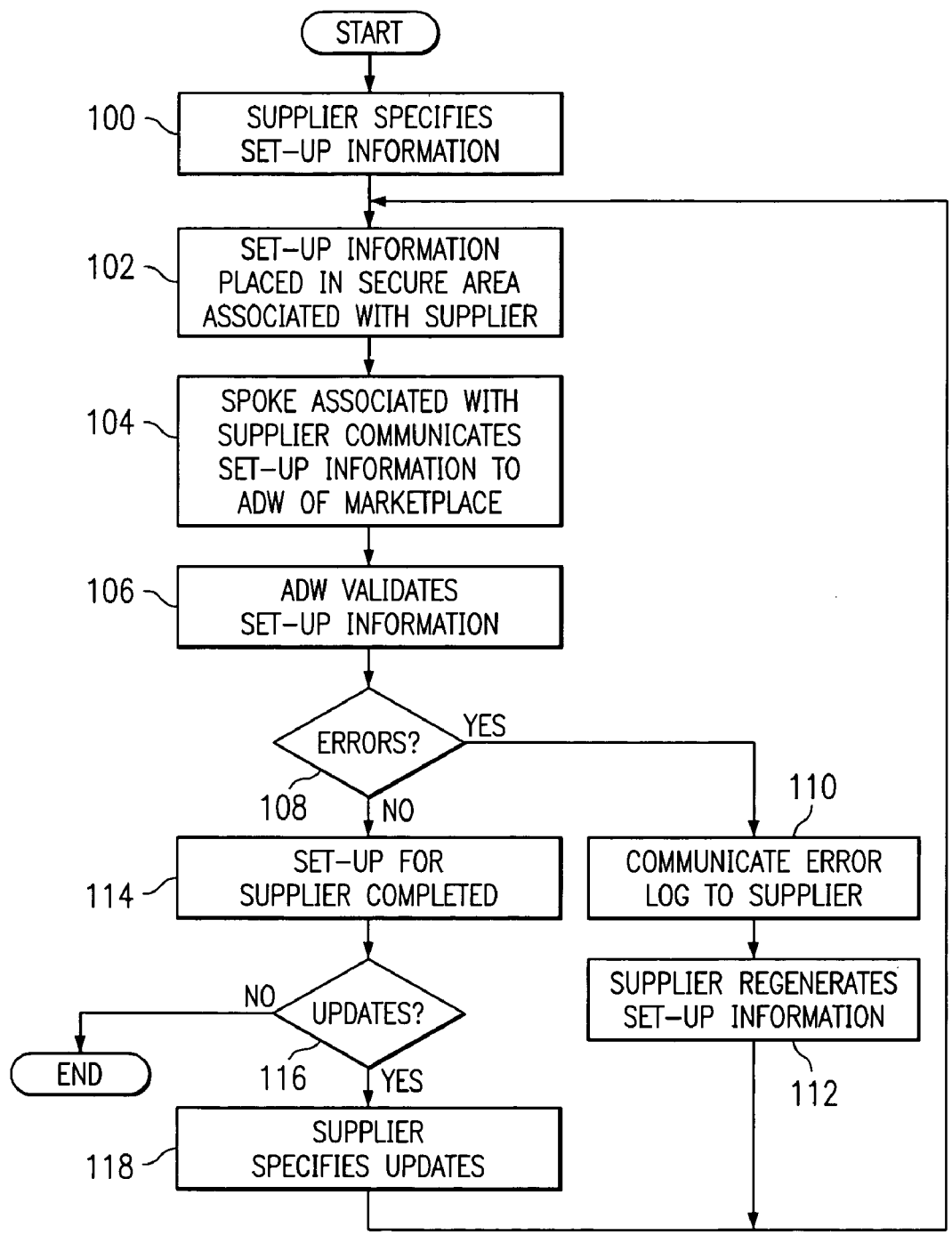
FIG. 4 illustrates an example method of setting up a system for providing guided buying decision support, based in part on past participant performance, in an electronic marketplace environment.

FIG. 1 illustrates an example system 10 that provides decision support based on past participant performance within an electronic marketplace environment. System 10 may include buyers 12, suppliers 14, and a business-to-business (B2B), business-to-consumer (B2C), or other electronic marketplace 16 that links buyers 12 to suppliers 14. In general, suppliers 14 make products or other items available to buyers 12 and may collaborate with buyers 12 in one or more ways to establish and maintain appropriate buyer-supplier relationships. Depending on the nature of marketplace 16, suppliers 14 may include manufacturers, distributors, wholesalers, retailers, or any other entities that supply items to buyers 12 and may collaborate with buyers 12 using marketplace 16. In general, marketplace 16 receives, compiles, and provides to a participant (i.e. a buyer 12 or supplier 14) information about the past performance of one or more other participants to allow the participant to make better decisions that may to improve their experience with marketplace 16 and the success of their collaborations and the executions based on these collaborations.

Ratings or other suitable performance information may be compiled, for each participant and for each activity involving that participant, based on feedback received from the other participants with which the participant has interacted. Feedback concerning a participant may be received with respect to its performance during one or more pre-execution collaboration phases, during an execution phase, or during one or more post-execution phases of a current execution cycle. In general, where appropriate, one or more pre-execution phases of an execution cycle are referred to collectively as a planning cycle for the execution cycle. The ratings or other performance information for this participant may then be provided to any other participants for decision support in connection with any suitable pre-execution stage of the same or a subsequent planning cycle, providing an important technical advantage. The ratings or other performance information may be personal to a participant (i.e. based only on interaction between the rating participant and the evaluated participant) or global to the marketplace (e.g., based on interactions between multiple rating participants and the evaluated participant). A participant is preferably always free to "override" or otherwise ignore information about the performance of other participants; however, it is assumed that the availability of such information will improve the overall marketplace experience for most participants and will seldom be ignored.

For example, in a qualification phase in which an enterprise evaluates potential collaboration partners, ratings or other performance information for the potential partners may be provided to the enterprise to allow the enterprise to determine which of these potential partners to collaborate with as to sourcing, design, production, or any other subsequent collaboration phase. Ratings or other performance information may reflect performance of a potential partner during prior collaboration phases of the same type (e.g., prior sourcing collaboration phases, where sourcing collaboration decisions are being made), prior collaboration phases of another type (e.g., prior design, production, or other collaboration phases, where sourcing collaboration decisions are being made), prior execution phases, or during prior post-execution phases, as appropriate.

Ratings or other performance information may be provided to an enterprise in connection with sourcing, design, production, or other collaboration decisions occurring subsequent to the qualification stage in a similar manner. For example, in a sourcing collaboration phase, the present invention may provide ratings or other performance information for a sourcing collaboration partner to the enterprise to allow the enterprise to determine whether and to what extent to which the partner may be relied on to meet the sourcing needs of the enterprise. If the partner has proven extremely reliable during prior execution phases, the enterprise may source all of its needs from the partner with the expectation that execution will be satisfactory. On the other hand, if the partner has proven rather unreliable, the enterprise may decide to source its needs from multiple partners to help ensure that its needs will actually be met.

Furthermore, as noted above, rating input for use in a pre-execution phase of a current planning cycle may be obtained in connection with pre-execution phases of the current or a previous planning cycle, such as in connection with one or more sourcing, design, production, or other collaboration phase for example. As just an example, with respect to a buyer, the present invention may provide for dynamic configuration of base fair share allocation criteria (specifying how demands are distributed among suppliers) within a production collaboration phase based on supplier performance during an earlier sourcing or design collaboration phase associated with the same or a previous execution cycle. Similarly, with respect to a supplier, the present invention may allow dynamic configuration of fulfillment criteria (specifying how available supply will be distributed among buyers) in a production collaboration phase based on buyer performance in an earlier phase of the same or a different execution cycle.

During an execution phase in which a participant consummates a commercial transaction, the present invention may enable ratings or other performance information for potential trading partners to be provided to the enterprise to allow the enterprise to determine which of these potential trading partners to purchase from or sell to. Ratings or other performance information may reflect performance of a potential partner during prior pre-execution phases of the same or one or more previous execution cycles, prior execution phases of one or more previous execution cycles, or prior post-execution phases of one or more previous execution cycles. For example, the marketplace 16 may provide information about past performance of suppliers 14 to a buyer 12 to allow the buyer 12 to determine whether, to what extent, and under what conditions to purchase from a particular supplier 14. Similarly, marketplace 16 may provide information about the past performance of buyers 12 to a supplier 14 or another participant (such as a financier or other financial entity) to allow the supplier 14 or other participant to better determine whether, to what extent, and under what conditions to transact business with a particular buyer 12.

For example, from the perspective of buyer 12 (the "buy side"), each supplier 14 may be initially registered with marketplace 16 with a neutral) rating. As a supplier 14 interacts with buyers 12 over time during pre-execution, execution, and post-execution phases, the marketplace 16 monitors the performance of the supplier 14. Based on the performance of supplier 14, overall and/or as to one or more particular activities, the marketplace 16 may assign a rating to supplier 14 that can then be communicated to buyers 12 in connection with supplier qualification and collaboration decisions and/or reflected in procurement options marketplace 16 provides to buyers 12. In connection with pre-execution collaboration, supplier 14 may be monitored as to how well supplier 14 performed from an overall perspective, whether supplier 14 demonstrated requisite expertise and experience, whether supplier 14 was responsive, whether supplier 14 was honest, or as to any other suitable performance measure. In connection with execution, supplier 14 may be monitored with respect to the quality of its products or other items generally and/or as to individual items or groups of items; its timeliness of delivery generally, as to individual items or groups of items, and/or under certain circumstances; its reliability of delivery generally, as to individual items or groups of items, and/or under certain circumstances; its service level generally, as to individual items or groups of items, and/or under certain circumstances; or any other performance aspects. Certain aspects of supplier performance may be monitored automatically by marketplace 16. Instead or in addition, aspects of supplier performance may be measured based on input from buyers 12 with which supplier 14 has interacted.

Consider, for example, a buyer 12 that accesses the marketplace 16 to fulfill its direct procurement requirements. When buyer 12 initially registers with the marketplace 16, the marketplace 16 may allow buyer 12 to specify one or more supplier criteria that serve as hard or soft constraints on suppliers 14 with which buyer 12 will collaborate in relation to those requirements or from which buyer 12 will purchase items. Marketplace 16 may rate suppliers 14 registered with marketplace 16, based on these buyer-specified criteria and its acquired knowledge with respect to the performance of these suppliers 14. Marketplace 16 may provide the ratings to the buyer 12 in connection with its subsequent qualification or collaboration decisions, may generate procurement options for buyer 12 that reflect the rankings, or may provide the ratings to buyer 12 in connection with such procurement options. Furthermore, based on the pre-sales, sales, or post-sales activity involving one or more suppliers 14, the buyer 12 may evaluate the performance of these suppliers 14 and provide supplier ratings or other feedback to the marketplace 16, which may store this information in a buyer profile for buyer 12. When buyer 12 accesses marketplace 16 on subsequent occasions in connection with qualification, collaboration, or procurement decisions, marketplace 16 may rely on the buyer profile, instead of or in addition to its acquired knowledge as to suppliers 14, in providing supplier ratings to buyer 12 or in generating procurement options for the buyer 12. Marketplace 16 may provide the buyer 12 with supplier ratings that are considered particularly relevant to the qualification, collaboration, or procurement decision being made (e.g., a supplier rating based on past design collaborations, where potential design collaboration partners are being evaluated), may provide buyer 12 with overall supplier ratings, or both. With each marketplace activity involving a supplier 14, marketplace 16 may increase its knowledge as to the performance of that supplier 14. The supplier 14 may thus be made to realize consequences of its actions, good or bad, as those actions are reflected in subsequent ratings provided to buyers 12 and/or used by marketplace 16. The present invention contemplates providing feedback from a buyer 12 based on supplier performance during any phase of a current or previous execution cycle (or constituent planning cycle) to the same or a different buyer 12 for decision support purposes in connection with any phase of the current execution cycle (or constituent planning cycle).

From the perspective of a supplier 14 (the "sell side"), each buyer 12 may be initially registered with marketplace 16 with a neutral rating. As a buyer 12 interacts with suppliers 14 or other participants (such as financiers or other financial entities) over time in connection with its pre-execution, execution, and post-execution activities, the marketplace 16 monitors the performance of buyer 12. Based on the performance of buyer 12, overall and/or as to one or more particular activities, the marketplace 16 may assign a rating to buyer 12 that can then be communicated to suppliers 14. In connection with pre-execution collaboration, buyer 12 may be monitored as to how well buyer 12 performed from an overall perspective, whether the buyer 12 demonstrated the requisite expertise and experience, whether buyer 12 was sufficiently responsive, whether buyer 12 was honest, or as to any other suitable performance measure. In connection with execution, buyer 12 may be monitored with respect to timeliness of payment, method of payment, or any other appropriate aspects of its performance. Certain aspects of buyer performance may be monitored automatically by marketplace 16. Instead or in addition, aspects of buyer performance may be measured based on input from suppliers 14 with which buyer 12 has interacted.

For example, consider a supplier 14 that makes products or other items available to buyers 12 through marketplace 16. When supplier 14 registers with marketplace 16, supplier 14 may specify one or more buyer criteria that serve as hard or soft constraints on buyers 12 with which the supplier 14 will collaborate. Marketplace 16 may rate the buyers 12 registered with marketplace 16, based on these supplier-specified criteria and its acquired knowledge as to the performance of these buyers 12. Marketplace 16 may provide the ratings to the supplier 14 in connection with its subsequent qualification or collaboration decisions or in connection with potential procurement initiated by buyers 12. Furthermore, based on pre-sales, sales, or post-sales activity involving one or more buyers 12, the supplier 14 may evaluate the performance of the buyers 12 and provide buyer ratings or other feedback to marketplace 16, which may store this information in a supplier profile for supplier 14. As supplier 14 is subsequently presented with potential opportunities to collaborate with buyers 12 or potential procurements initiated by buyers 12, the marketplace 16 may rely on the supplier profile, instead of or in addition to its acquired knowledge with respect to buyers 12, in providing buyer ratings to supplier 14. Marketplace 16 may provide the supplier 14 with buyer ratings considered particularly relevant to the qualification, collaboration, or procurement-related decision being made (e.g., a buyer rating based on past production collaborations, where potential production collaboration partners are being evaluated), may provide supplier 14 with overall buyer ratings, or both. With each marketplace activity involving a buyer 12, marketplace 16 may increase its knowledge as to the performance of that buyer 12. Buyer 12 may thus be made to realize the consequences of its actions, good or bad, as its actions are reflected in subsequent ratings provided to suppliers 14. The present invention contemplates providing feedback from a supplier 14 based on buyer performance in any phase of a current or previous execution cycle (or its constituent planning cycle) to the same or a different supplier 14 for decision support purposes in connection with any phase of the current execution cycle (or its constituent planning cycle).

In one embodiment, marketplace 16 maintains a current general rating for each buyer 12 and supplier 14 reflecting its performance with respect to all other participants over a specified time period. For example, a particular supplier 14 may have a general rating of "4.5" on a five point scale. The rating may vary over time as other participants provide their ratings or other feedback concerning supplier 14, as a moving average or otherwise. For example, if a particular buyer 12 that has just completed collaborating with supplier 14 on the design of a sub-component submits a rating for supplier 14 of "1.0" on a five point scale, because supplier 14 lacked the requisite design expertise or otherwise, the general rating for supplier 14 might be reduced to "4.2" substantially immediately. A general rating may reflect all feedback from all other participants as to all activities or may reflect all feedback from all other participants as to a single activity or set of activities.

The marketplace 16 may, based on its monitoring of participant performance, temporarily or permanently restrict (or remove) qualification of a participant to interact with other participants using marketplace 16. For example, a supplier 14 that receives a relatively high number of low ratings from a representative sample of buyers 12 may have its qualification restricted accordingly. Qualification to participate may be granted (or restricted) on an overall basis or as to a certain activity or activities. For example, a supplier 14 that receives a relatively high number of very low ratings with respect to design collaboration might be restricted from design collaboration through marketplace 16, but still retain its qualification to participate in other collaboration and procurement scenarios. The present invention contemplates any appropriate policies to enhance the status of marketplace 16 as a trusted commercial entity.

The marketplace 16 may also maintain a rating of a buyer 12 or a supplier 14 that is "personal" as to a particular supplier 14 or buyer 12, respectively (or as to any other participant such as a financial agent). In the above example, the buyer 12 might have a personalized rating for supplier 14 of "3.7" on a five point scale, indicating that the lack of design expertise or other issue may have been anomalous (at least as to the particular buyer 12) and that the supplier 14 has performed fairly well overall with respect to the particular buyer 12 (although possibly not as well as with respect to the marketplace community as a whole). Such personalized ratings may be stored in the corresponding profile for the participant. A personalized rating may reflect all the feedback from the participant as to all activities or may reflect all feedback from the participant as to a single activity or set of activities. A participant may be allowed to drop one or more particular personalized ratings from its profile to account for any positive or negative aberrations, stale data, or other factors that may skew its overall personalized rating for another participant such that the rating does not properly reflect the willingness of the participant to interact with the other participant. A participant may be allowed to drop the personalized ratings entirely for one or more other participants. While ratings are described, in this document the term "rating" is intended to encompass any appropriate indication of performance unless explicitly indicated otherwise.

Buyers 12, suppliers 14, and marketplace 16 may each operate on one or more computer systems at one or more locations and may share data storage, communications, or other resources according to particular needs. These computer systems may include appropriate input devices, output devices, mass storage media, processors, memory, or other components for receiving, processing, storing, and communicating information in accordance with operation of system 10. As used in this document, the term "computer" is intended to encompass a personal computer, workstation, network computer, wireless data port, wireless telephone, personal digital assistant, one or more microprocessors in these or other devices, or any other suitable processing device.

Buyers 12 and suppliers 14 may interact with marketplace 16 autonomously or according to input from one or more users. Buyers 12 and suppliers 14 may be coupled to the marketplace 16 using one or more local area networks (LANs), metropolitan area networks (MANs), wide area networks (WANs), a global computer network such as the Internet, or any other appropriate wireline, optical, wireless, or other links. Buyers 12, suppliers 14, and marketplace 16 may communicate with each other according to a hub-and-spoke, peer-to-peer, or other suitable architecture. In one embodiment, system 10 is implemented using a hub-and-spoke architecture in which the spokes are appropriately integrated with enterprise systems of buyers 12 and suppliers 14 and allow schedule-based data transfer between these enterprise systems and marketplace 16.

FIG. 2 illustrates example buyer and supplier planning funnels 18a and 18b, respectively, incorporating qualification, sourcing collaboration (i.e. contract negotiation and creation), design collaboration, production collaboration (i.e. demand collaboration, capacity collaboration, etc.), execution (i.e. purchase order creation, order management, etc.), and customer care stages. Each buyer 12 and supplier 14 would typically have its own planning funnel 18, with more or fewer stages than are illustrated in FIG. 2, according to particular needs and circumstances. Collectively, as described above, the execution stage and any stages of planning funnel 18 preceding execution stage may be referred to as an execution cycle, where the stages preceding the execution stage may be referred to as the planning cycle corresponding to the execution cycle. Based on the performance of a buyer 12 in connection with a particular stage of planning funnel 18a, the supplier 14 or other participant with which buyer 12 is interacting may provide a rating or other feedback concerning the performance of the buyer 12. Marketplace 16 may also automatically track the performance of buyer 12. Analogously, based on the performance of a supplier 14 in connection with a particular stage of planning funnel 18b, the buyer 12 or other participant with which supplier 14 is interacting may provide a rating or other feedback concerning the performance of the supplier 14. Marketplace 16 may also automatically track the performance of supplier 14. In one embodiment, the accumulated information concerning the performance of a particular buyer 12 or supplier 14 is made available to participants interacting with the particular buyer 12 or supplier 14, respectively, at any stage of a corresponding planning funnel 18 to allow those participants to make more informed decisions with respect to interactions with the particular buyer 12 or supplier 14, respectively.

As a particular example, at the qualification stage, a buyer 12 may be provided with one or more supplier ratings for a supplier 14 with which buyer 12 is considering collaborating. Such supplier ratings might include an overall supplier rating maintained by marketplace 16, a personalized supplier rating maintained in a buyer profile for the buyer 12, or any other suitable supplier rating. Based on the supplier ratings, buyer 12 may determine that supplier 14 is an acceptable collaboration partner, that supplier 14 may be an acceptable collaboration partner but that caution is warranted, or that supplier 14 is simply not an acceptable collaboration partner. Thus, buyer 12 is able to make a more informed decision as to collaboration with the supplier 14 than would be possible without the availability of supplier rating information. Supplier ratings may similarly be used at the sourcing collaboration, design collaboration, production collaboration, or any other stage of buyer planning funnel 18a. Buyer ratings may be analogously used at the qualification, sourcing collaboration, design collaboration, production collaboration, or any other stage of supplier planning funnel 18b.

As another particular example, during capacity collaboration at the production collaboration stage, a supplier 14 may agree to supply a buyer 12 with between eighty and one hundred units of a product (upper and lower "flex limits") within seven days in response to a demand from buyer 12. However, if one or more supplier ratings for the supplier 14 indicate that supplier 14 has not been very reliable, then marketplace 16 may inform buyer 12 of this fact by providing buyer 12 one or more supplier ratings for supplier 14. Marketplace 16 may provide buyer 12 a general rating, personalized rating, or any other suitable rating for the supplier 14. Marketplace 16 may provide buyer 12 a more specific rating that reflects the performance of supplier 14 with respect to similar quantity, delivery time, or other constraints. Marketplace 16 may further provide the buyer 12 a numerical, text, or other indication of the reasons for a rating (e.g., "35% of orders late, 3 days on average, due to lack of capacity"). Based on one or more ratings for supplier 14, buyer 12 might decide to reduce the flex limits for this supplier 14 to between sixty and eighty units (down from between eighty and one hundred units) and then collaborate with another supplier 14 for the remaining twenty units to improve the likelihood that its requirements will be timely met. Marketplace 16 may automatically reduce such flex limits to appropriate levels based on supplier ratings, with buyer 12 preferably having the ability to override any automatic reduction. As a result of the learning capability of marketplace 16, buyer 12 is thus less likely to be impacted by the failure of supplier 14 to perform as promised.

As another example, with respect to buyer 12, the present invention may provide for dynamic configuration of base fair share allocation criteria (specifying how demands are distributed among suppliers 14) within a production collaboration phase based on supplier performance during an earlier sourcing or design collaboration phase associated with the same or a previous execution cycle. Similarly, with respect to a supplier 14, the present invention may allow dynamic configuration of fulfillment criteria (specifying how available supply will be distributed among buyers 12) in a production collaboration phase according to buyer performance during an earlier phase of the same or a different execution cycle.

As another particular example, consider a supplier 14 that receives a last minute order from a large buyer 12. Supplier 14 would like to accept the order, but doing so would require supplier 14 to drop an existing order from another buyer 12. Before the supplier 14 accepts the order from the large buyer 12, it may be desirable for supplier 14 to know how the large buyer 12 has performed in the past with respect to timeliness of payment. If the large buyer 12 has a rating of "4.7" on a five point scale, for example, supplier 14 might be better off accepting the order than if the large buyer 12 has a rating of "1.2" on a five point scale. Buyer ratings may be similarly useful in allowing supplier 14 to allocate its capacity between two orders received concurrently from two different buyers 12, between two buyers 12 during demand collaboration stage at the production collaboration stage, or in any other suitable context. Although particular examples are described, those skilled in the art will appreciate that the present invention encompasses using ratings or other feedback concerning participant performance in connection with any suitable subsequent marketplace decision or activity.

FIG. 3 illustrates example marketplace 16, and interactions with various buyers 12 and suppliers 14, in further detail. Marketplace 16 may include one or more firewalls 20 establishing a "DMZ" or other secure area 22 that separates buyers 12 and suppliers 14 from certain processing and data storage resources of marketplace 16. In one embodiment, DMZ 22 isolates a file transfer protocol (FTP) or other file server 24 that receives data files 26 from enterprise systems 28 associated with buyers 12 and suppliers 14. File server 24 communicates the data files 26 to a database tier 30 of the marketplace 16 for storage in database 32 as flatfiles or otherwise. Where marketplace 16 provides one or more hosted planning services, the file server 24 may also receive planning output 34 from one or more planning engines 36 in an application tier 38 of marketplace 16. File server 24 communicates the planning output 34 to the enterprise systems 28 associated with the buyers 12 and suppliers 14 as appropriate. In a more particular embodiment, the planning engine 36 is a supply chain planning engine that generates planning information for some or all of the value chain containing buyers 12 and suppliers 14 based on data files 26 received from enterprise systems 28. Planning engine 36 may interact with database 32 or, more preferably with respect to particular tasks, with an active data warehouse (ADW) 40 in which the information contained in data files 26 may be stored and updated.

DMZ 22 also isolates one or more web servers 42, within a web tier 44 of the marketplace 16, that communicate between a manager 46 within application tier 38 and one or more users 48 associated with the buyers 12 and suppliers 14. For example, web server 42 may communicate with users 48 using Hypertext Markup Language (HTML) pages or Extensible Markup Language (XML) documents contained in Secure Hypertext Transfer Protocol (S-HTTP) or other suitable requests. While file-based, web-based, and other communication techniques are described, members of the marketplace environment may communicate in any appropriate manner without departing from the intended scope of the present invention. Where appropriate, reference to the actions of buyers 12 and suppliers 14 is meant to encompass the actions of associated enterprise systems 28 and/or users 48. As described above, buyers 12 and suppliers 14 may be entirely or at least substantially autonomous in certain embodiments.

Database 50 may store information concerning past performance of buyers 12, suppliers 14, or other marketplace participants. For example and without limitation, database 52 may store: (1) buyer profiles for one or more buyers 12 containing buyer-provided criteria for suppliers 14 or other participants (e.g., financial agents); (2) supplier profiles for one or more suppliers 14 containing supplier-provided criteria for buyers 12 or other participants (e.g., financial agents); (3) ratings for one or more suppliers 14 (generally, as to one or more activities, or under one or more circumstances) generated automatically by marketplace 16 based on its monitoring of supplier performance over time, based on ratings or other feedback received over time from one or more buyers 12, or any combination of marketplace-generated and buyer-provided supplier performance information; and (4) ratings for one or more buyers 12 (generally, as to one or more activities, or under one or more circumstances) generated automatically by marketplace 16 based on its monitoring of buyer performance over time, based on ratings or other feedback received over time from suppliers 14, or any combination of marketplace-generated and supplier-provided buyer performance information. Such information may be used in connection with decisions to be made at any stage of an appropriate planning funnel 18.

In one embodiment, manager 46 is responsible for managing the flow of data to, from, and within marketplace 16 in connection with accumulating ratings, maintaining participant profiles, providing ratings to participants, and other activities described more fully above. Manager 46 may have access to ADW 40 if appropriate and may access information stored in database 50 in connection with its operations. Although database 32, ADW 40, and database 50 are described as being separate, the present invention contemplates these storage components being wholly or partially integral to one another, according to particular needs. The components of marketplace 16 may be implemented using any appropriate combination of software, firmware, hardware, or other suitable media. Software components of marketplace 16 may be implemented according to any suitable software methodologies. For example, planning engine 36 and manager 46 may be implemented using object-oriented software methodologies.

FIG. 4 illustrates an example method of setting up marketplace 16 to provide decision support based on past participant performance as described above. Although described primarily in connection with set-up information for a supplier 14, the present invention contemplates the method being performed analogously for each buyer 12 and supplier 14 coupled to marketplace 16. The method begins at step 100, where supplier 14 specifies its set-up information. Set-up information for supplier 14 may include, in any suitable combination and without limitation: items generally available from supplier 14; collaboration activities in which supplier 14 is willing to participate; information about contracts that exist between supplier 14 and buyers 12; communications information to allow the enterprise systems 28 of the supplier 14 to communicate ratings, data files 26, planning output 34, or other appropriate information with marketplace 16; credit-related information; payment-related information; or other suitable set-up information.

At step 102, the set-up information for supplier 14 is placed in a specified data storage location associated with supplier 14, such as behind a firewall that secures this information against unauthorized access. In a particular embodiment, at step 104, the spoke associated with supplier 14 picks up the set-up information and communicates it over the Internet or otherwise to marketplace 16 for storage in database 32 and preferably ADW 40. A user 48 may assist in communicating set-up information to marketplace 16, particularly the first time set-up information is communicated for the particular supplier 14. Thereafter, updated set-up information may be automatically communicated by the spoke from the supplier 14 to marketplace 16 on a scheduled basis.

At step 106, ADW 40 may validate one or more suitable aspects of the set-up information. If errors exist at step 108, an error log is generated and communicated to supplier 14 at step 110. In one embodiment, the error log is placed in a specified data storage location associated with supplier 14, such as behind a firewall that secures this information against unauthorized access. At step 112, supplier 14 accesses the error log, makes appropriate corrections, and regenerates some or all of the set-up information for the supplier 14. The method then returns to step 102. If no errors exist at step 108, then set-up is complete for supplier 14 at step 114.

If updates to the set-up information are warranted at step 116, supplier 14 specifies the updates at step 118 and the method then returns to step 102. The present invention contemplates updating set-up information for a supplier 14 periodically, according to an appropriate schedule, as long as supplier 14 is associated with the marketplace 16. If the supplier 14 disassociates from the marketplace 16 such that no updates occur at step 116, the method ends.

Figure 5:
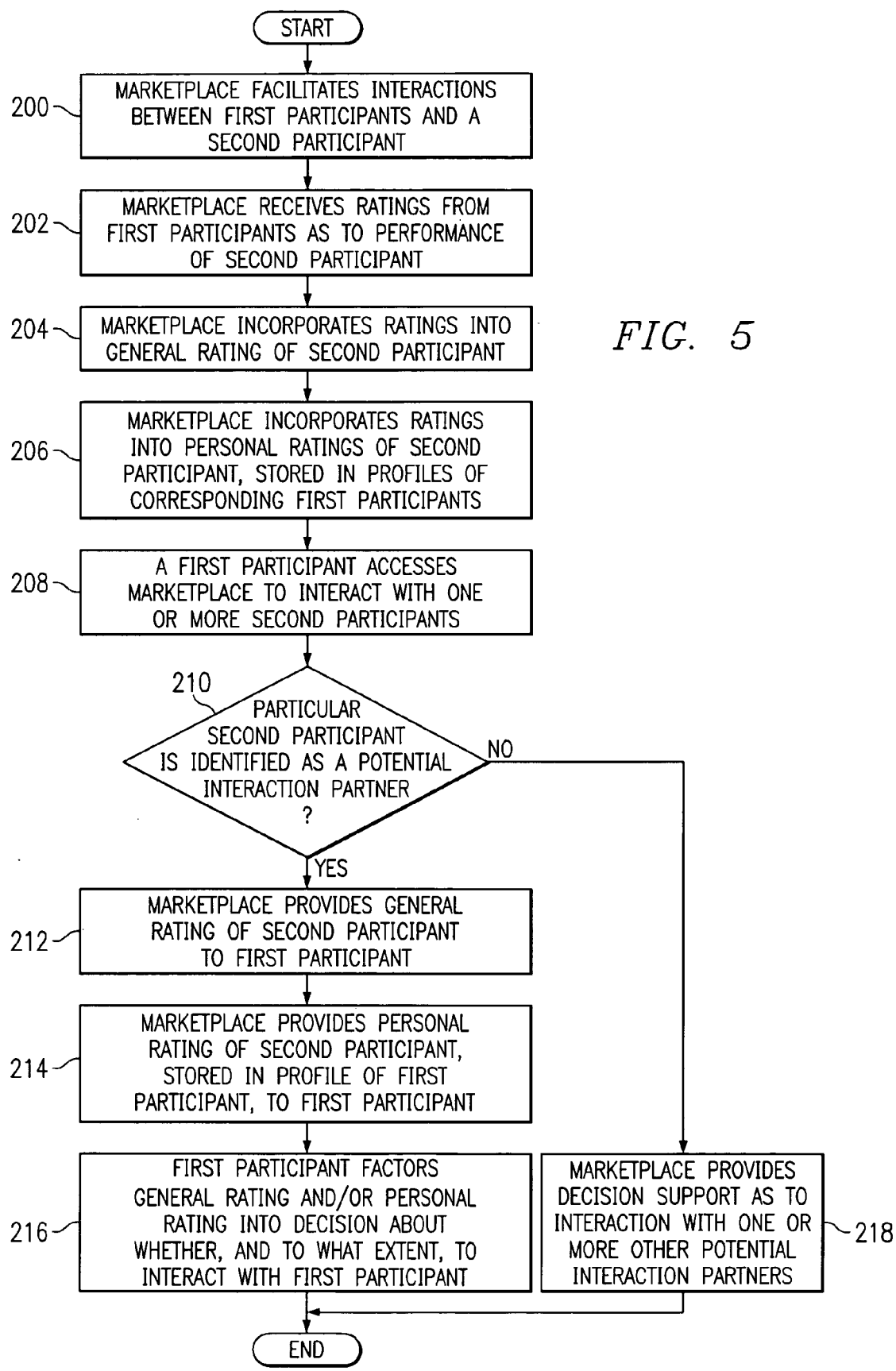
FIG. 5 illustrates an example method of providing guided buying decision support, based in part on past participant performance, within an electronic marketplace environment.

FIG. 5 illustrates an example method of providing decision support based on past participant performance using the resources of marketplace 16. The method begins at step 200, where marketplace 16 facilitates interactions, over time, between multiple first participants and a particular second participant. For example, the first participants may be buyers 12 and the second participant may be a supplier 14 with whom buyers 12 have collaborated as to sourcing, design, production, or otherwise. At step 202, the marketplace 16 receives ratings or other appropriate feedback from the first participants (buyers 12) as to performance of the second participant (supplier 14) in the context of these interactions. In one embodiment, marketplace 16 incorporates the received ratings into the general rating it maintains for the second participant (supplier 14) at step 204, and also incorporates the received ratings into the personal rating it maintains for the second participant (supplier 14) within the profiles of corresponding first participants (buyers 12) at step 206.

At step 208, a particular first participant (buyer 12) accesses marketplace 16 to interact with one or more second participants (suppliers 14), for example, to collaborate with respect to its capacity requirements. Assuming the particular second participant (supplier 14) is identified as a potential interaction partner at step 210, either automatically by marketplace 16 or by the first participant (buyer 12) in response to information provided by marketplace 16, then marketplace 16 provides decision support to the first participant (buyer 12) in connection with the interaction. In one embodiment, the marketplace 16 provides the general rating for the second participant (supplier 14) to the first participant (buyer 12) at step 212, and also provides the personal rating for the second participant (supplier 14) maintained within the profile of the first participant (buyer 12) to the first participant (buyer 12) at step 214.

At step 216, the first participant (buyer 12) preferably factors the general rating and/or the personal rating for the second participant (supplier 14) into its decision regarding whether, and to what extent, to interact with the second participant (supplier 14). As just an example, if the general and/or personal rating for the second participant (supplier 14) is very poor, the first participant (buyer 12) may decide not to engage in capacity collaboration with the second participant (supplier 14) to avoid any exposure to non-performance of the second participant (supplier 14). If the general and/or personal rating for the second participant (supplier 14) is fairly neutral, the first participant (buyer 12) may decide to seek additional capacity collaborations with one or more other second participants (suppliers 14) to limit its exposure to any non-performance of the second participant (supplier 14). If the general and/or personal rating for the second participant (supplier 14) is very good, the first participant (buyer 12) may decide to collaborate only with the second participant (supplier 14) and face full exposure to any non-performance of the second participant (supplier 14), with the expectation that risk of non-performance will be low. As participants become more familiar with this feature of marketplace 16 and as the volume or general and/or personal ratings increase, participants may rely on this feature with increasing confidence, preferably increasing the efficiency with which participants interact with the marketplace 16 and with each other, reducing transaction costs, and decreasing the number of unsatisfactory interactions. If the particular second participant (supplier 14) is not identified as a potential interaction partner at step 210, then the method may operate analogously as to one or more other potential interaction partners at step 218.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented electronic marketplace system operating on one or more computer systems each comprising one or more processing units and one or more memory units, the electronic marketplace system operable to:

using the one or more computer systems, facilitate marketplace interactions between one or more first participants and a particular second participant;

using the one or more computer systems, receive electronic feedback concerning performance of the particular second participant from computer systems associated with the first participants based on their interactions with the particular second participant;

using the one or more computer systems, associate a participant-specific rating with the particular second participant based on the electronic feedback received from a computer system associated with a particular first participant, the participant-specific rating of the particular second participant being specific to the particular first participant, being independent of electronic feedback received from computer systems associated with other first participants, and being stored in a computer-implemented profile maintained for the particular first participant;

using the one or more computer systems, receive an identification of the particular first participant and an identification of the particular second participant as a potential interaction partner for the particular first participant with respect to a potential interaction;

using the one or more computer systems, based on the identification of the particular first participant, identify and access the computer-implemented profile maintained for the particular first participant independent of accessing computer-implemented profiles maintained for other first participants; and using the one or more computer systems, according to the participant-specific rating of the particular second participant stored in the identified and accessed computer-implemented profile maintained for the particular first participant, provide an electronic indication to a computer system associated with the particular first participant reflecting the desirability of interacting with the particular second participant with respect to the potential interaction, the electronic indication being specific to the particular first participant and being organized independent of ratings of the particular second participant that are associated with other first participants.

2. The system of claim 1, wherein the interaction on which the rating is based comprises a first collaboration activity and the potential interaction comprises a second collaboration activity.

3. The system of claim 2, wherein the first collaboration activity and the second collaboration activity are different types of collaboration activities.

4. The system of claim 2, wherein each of the first and second collaboration activities are selected from the group consisting of a sourcing collaboration activity, a design collaboration activity, and a production collaboration activity.

5. The system of claim 1, wherein the interaction comprises execution of a previously negotiated transaction and the potential interaction comprises a collaboration activity.

6. The system of claim 1, wherein:
the potential interaction comprises a capacity collaboration activity; and
the participant-specific rating of the particular second participant indicates to the particular first participant the desirability of modifying one or more terms of an agreement with the particular second participant requiring the particular second participant to supply a specified number of units to the particular first participant within a specified time in response to a demand from the particular first participant.

7. The system of claim 1, wherein:
the electronic feedback received from the computer system associated with the particular first participant comprises a numerical single-interaction rating according to a predetermined rating scale; and
the participant-specific rating of the particular second participant comprises a numerical aggregate rating according to the same predetermined rating scale reflecting a plurality of single-interaction ratings received from the computer system associated with the particular first participant over time based on interactions of the particular first participant with the particular second participant.

8. The system of claim 1, wherein the electronic indication provided to the computer system associated with the particular first participant comprises the rating for the particular second participant.

9. The system of claim 1, further operable to:
using the one or more computer systems, associate a general rating with the particular second participant according to all the electronic feedback received from the computer systems associated with the first participants based on interactions between the first participants and the particular second participant; and
using the one or more computer systems, provide the electronic indication to the computer system associated with the particular first participant reflecting the desirability of interacting with the particular second participant with respect to the potential interaction further based on the general rating for the particular second participant.

10. The system of claim 1, wherein the first participants are buyers and the particular second participant is a supplier.

11. A computer-implemented method performed using a computer system associated with an electronic marketplace, the computer system comprising one or more processing units and one or more memory units, the method comprising:
using the computer system, facilitating marketplace interactions between one or more first participants and a particular second participant;
using the computer system, receiving electronic feedback concerning performance of the particular second participant from the first participants based on their interactions with the particular second participant;
using the computer system, associating a participant-specific rating with the particular second participant based on the electronic feedback received from a computer system associated with a particular first participant, the participant-specific rating of the particular second participant being specific to the particular first participant, being independent of feedback received from computer systems associated with other first participants, and being stored in a computer-implemented profile maintained for the particular first participant;
using the one or more computer systems, receiving an identification of the particular first participant and an identification of the particular second participant as a potential interaction partner for the particular first participant with respect to a potential interaction;
using the computer system, based on the identification of the particular first participant identifying and accessing the computer-implemented profile maintained for the particular first participant independent of accessing computer-implemented profiles maintained for other first participants; and
using the computer system, according to the participant-specific rating of the particular second participant stored in the identified and accessed computer-implemented profile maintained for the particular first participant, providing an electronic indication to a computer system associated with the particular first participant reflecting the desirability of interacting with the particular second participant with respect to the potential interaction the electronic indication being specific to the particular first participant and being organized independent of ratings of the particular second participant that are associated with other first participants.

12. The method of claim 11, wherein the interaction on which the rating is based comprises a first collaboration activity and the potential interaction comprises a second collaboration activity.

13. The method of claim 12, wherein the first collaboration activity and the second collaboration activity are different types of collaboration activities.

14. The method of claim 12, wherein each first and second collaboration activity is selected from the group consisting of a sourcing collaboration activity, a design collaboration activity, and a production collaboration activity.

15. The method of claim 11, wherein the interaction comprises execution of a previously negotiated transaction and the potential interaction comprises a collaboration activity.

16. The method of claim 11, wherein:
the potential interaction comprises a capacity collaboration activity; and
the participant-specific rating of the particular second participant indicates to the particular first participant the desirability of modifying one or more terms of an agreement with the particular second participant requiring the particular second participant to supply a specified number of units to the particular first participant within a specified time in response to a demand from the particular first participant.

17. The method of claim 11, wherein:
the electronic feedback received from the computer system associated with the particular first participant comprises a numerical single-interaction rating according to a predetermined rating scale; and the participant-specific rating of the particular second participant comprises a numerical aggregate rating according to the same predetermined rating scale reflecting a plurality of single-interaction ratings received from the computer system associated with the particular first participant over time based on interactions of the particular first participant with the particular second participant.

18. The method of claim 11, wherein the electronic indication provided to the computer system associated with the particular first participant comprises the rating for the particular second participant.

19. The method of claim 11, further comprising:

using the computer system, associating a general rating with the particular second participant according to all the electronic feedback received from the computer systems associated with the first participants based on interactions between the first participants and the particular second participant; and using the computer system, providing the electronic indication to the computer system associated with the particular first participant reflecting the desirability of interacting with the particular second participant with respect to the potential interaction further based on the general rating for the particular second participant.

20. The method of claim 11, wherein the first participants are buyers and the particular second participant is a supplier.

21. Electronic marketplace software embodied in computer-readable media and when executed operable to:

facilitate marketplace interactions between one or more first participants and a particular second participant;

receive feedback concerning performance of the particular second participant from the first participants based on their interactions with the particular second participant;

associate a participant-specific rating with the particular second participant based on the feedback received from a particular first participant, the participant-specific rating of the particular second participant being specific to the particular first participant, being independent of feedback received from other first participants, and being stored in a profile maintained for the particular first participant;

receive an identification of the particular first participant and an identification of the particular second participant as a potential interaction partner for the particular first participant with respect to a potential interaction;

based on the identification of the particular first participant, identify and access the profile maintained for the particular first participant independent of accessing profiles maintained for other first participants; and according to the participant-specific rating of the particular second participant stored in the identified and accessed profile maintained for the particular first participant, provide an indication to the particular first participant reflecting the desirability of interacting with the particular second participant with respect to the potential interaction, the electronic indication being specific to the particular first participant and being organized independent of ratings of the particular second participant that are associated with other first participants.

22. The software of claim 21, wherein the interaction on which the rating is based comprises a first collaboration activity and the potential interaction comprises a second collaboration activity.

23. The software of claim 22, wherein the first collaboration activity and the second collaboration activity are different types of collaboration activities.

24. The software of claim 22, wherein each first and second collaboration activity is selected from the group consisting of a sourcing collaboration activity, a design collaboration activity and a production collaboration activity.

25. The software of claim 21, wherein the interaction comprises execution of a previously negotiated transaction and the potential interaction comprises a collaboration activity.

26. The software of claim 21, wherein:

the potential interaction comprises a capacity collaboration activity; and the participant-specific rating of the particular second participant indicates to the particular first participant the desirability of modifying one or more terms of an agreement with the particular second participant requiring the particular second participant to supply a specified number of units to the particular first participant within a specified time in response to a demand from the particular first participant.

27. The software of claim 21, wherein:

the feedback received from the particular first participant comprises a numerical single-interaction rating according to a predetermined rating scale; and the participant-specific rating of the particular second participant comprises a numerical aggregate rating according to the same predetermined rating scale reflecting a plurality of single-interaction ratings received from the particular first participant over time based on interactions of the particular first participant with the particular second participant.

28. The software of claim 21, wherein the indication provided to the particular first participant comprises the rating for the particular second participant.

29. The software of claim 21, further operable to:

associate a general rating with the particular second participant according to all the feedback received from the first participants based on interactions between the first participants and the particular second participant; and provide the indication to the particular first participant reflecting the desirability of interacting with the particular second participant with respect to the potential interaction further based on the general rating for the particular second participant.

30. The software of claim 21, wherein the first participants are buyers and the particular second participant is a supplier.

31. A computer-implemented electronic marketplace system operating on one or more computer systems each comprising one or more processing units and one or more memory units, the system comprising:

computer-implemented means for facilitating interactions between one or more first participants and a particular second participant;

computer-implemented means for receiving electronic feedback concerning performance of the particular second participant from computer systems associated with the first participants based on their interactions with the particular second participant;

computer-implemented means for associating a participant-specific rating with the particular second participant based on the electronic feedback received from a computer system associated with a particular first participant, the participant-specific rating of the particular second participant being specific to the particular first participant, being independent of electronic feedback received from computer systems associated with other first participants, and being stored in a computer-implemented profile maintained for the particular first participant;

computer-implemented means for receiving an identification of the particular first participant and an identification of the particular second participant as a potential interaction partner for the particular first participant with respect to a potential interaction;

computer-implemented means for, based on the identification of the particular first participant, identifying and accessing the computer-implemented profile maintained for the particular first participant independent of accessing computer-implemented profiles maintained for other first participants; and computer-implemented means for, according to the participant-specific rating of the particular second participant stored in the identified and accessed computer-implemented profile maintained for the particular first participant, providing an electronic indication to a computer system associated with the particular first participant reflecting the desirability of interacting with the particular second participant with respect to the potential interaction the electronic indication being specific to the particular first participant and being organized independent of ratings of the particular second participant that are associated with other first participants.

32. The system of claim 1, further operable to monitor, automatically and independent of electronic feedback associated with the first participants, one or more aspects of the particular second participant's performance during its interactions with the one or more first participants.

33. The method of claim 11, further comprising monitoring, automatically and independent of electronic feedback associated with the first participants, one or more aspects of the particular second participant's performance during its interactions with the one or more first participants.

34. The software of claim 21, further operable to monitor, automatically and independent of electronic feedback associated with the first participants, one or more aspects of the particular second participant's performance during its interactions with the one or more first participants.

* * * * *